B. G. RICHARDS.
STACKING MACHINE.
APPLICATION FILED MAY 31, 1913.

1,117,244.

Patented Nov. 17, 1914.
13 SHEETS—SHEET 1.

B. G. RICHARDS.
STACKING MACHINE.
APPLICATION FILED MAY 31, 1913.

1,117,244.

Patented Nov. 17, 1914.
13 SHEETS—SHEET 6.

Witnesses:
C. E. Wessels.
T. Colson.

Inventor:
Brayton G. Richards,
By Joshua R. H. Potts
his Attorney.

B. G. RICHARDS.
STACKING MACHINE.
APPLICATION FILED MAY 31, 1913.

1,117,244.

Patented Nov. 17, 1914.
13 SHEETS—SHEET 7.

Witnesses:
C. E. Wessels.
T. Colson.

Inventor:
Brayton G. Richards,
By Joshua R. H. Potts
his Attorney.

B. G. RICHARDS.
STACKING MACHINE.
APPLICATION FILED MAY 31, 1913.
1,117,244.
Patented Nov. 17, 1914.
13 SHEETS—SHEET 8.
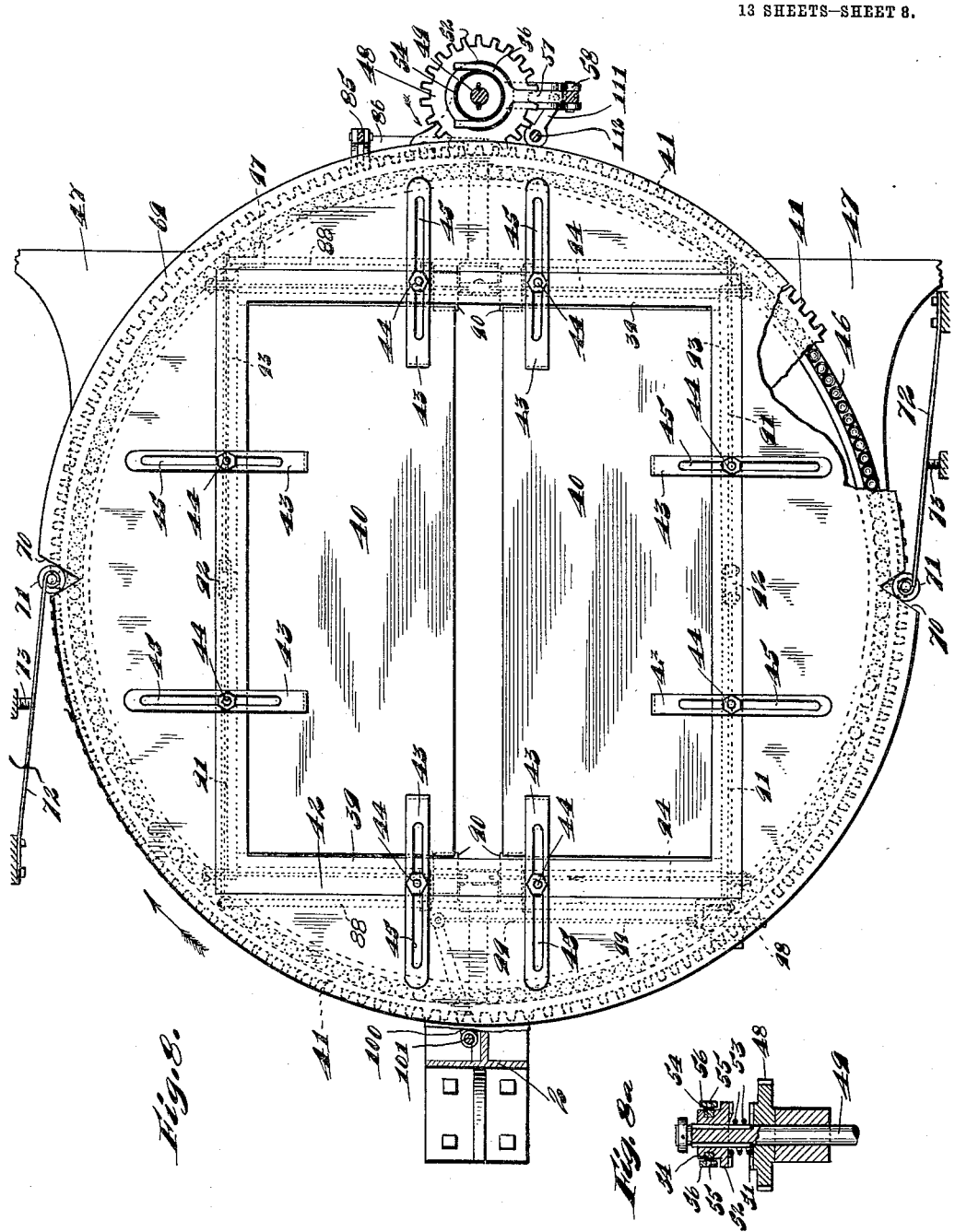
Witnesses:
C. E. Wessels.
T. Colson.
Inventor:
Brayton G. Richards,
By Joshua R. H. Potts
his Attorney.

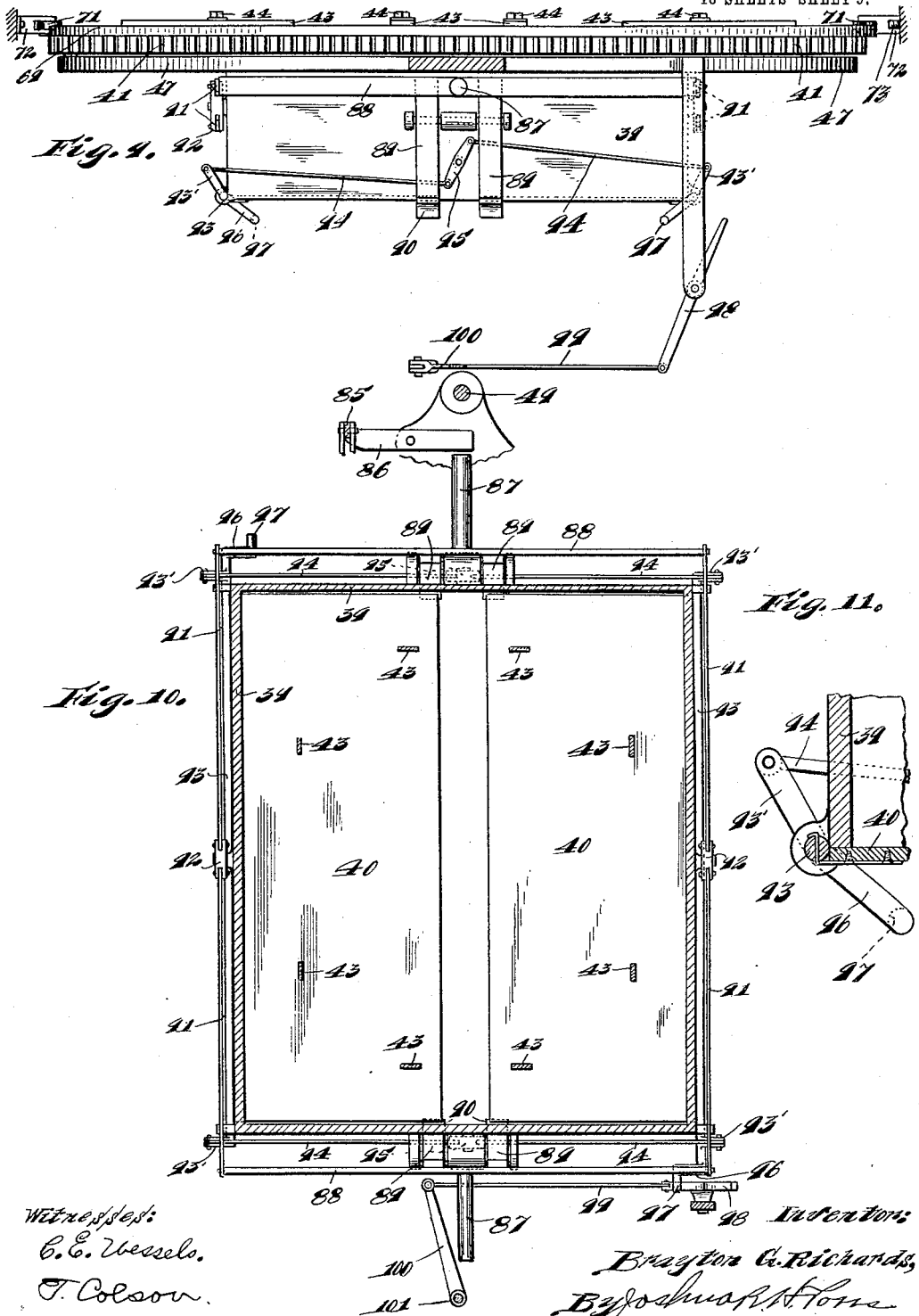

B. G. RICHARDS.
STACKING MACHINE.
APPLICATION FILED MAY 31, 1913.
1,117,244.
Patented Nov. 17, 1914.
13 SHEETS—SHEET 10.
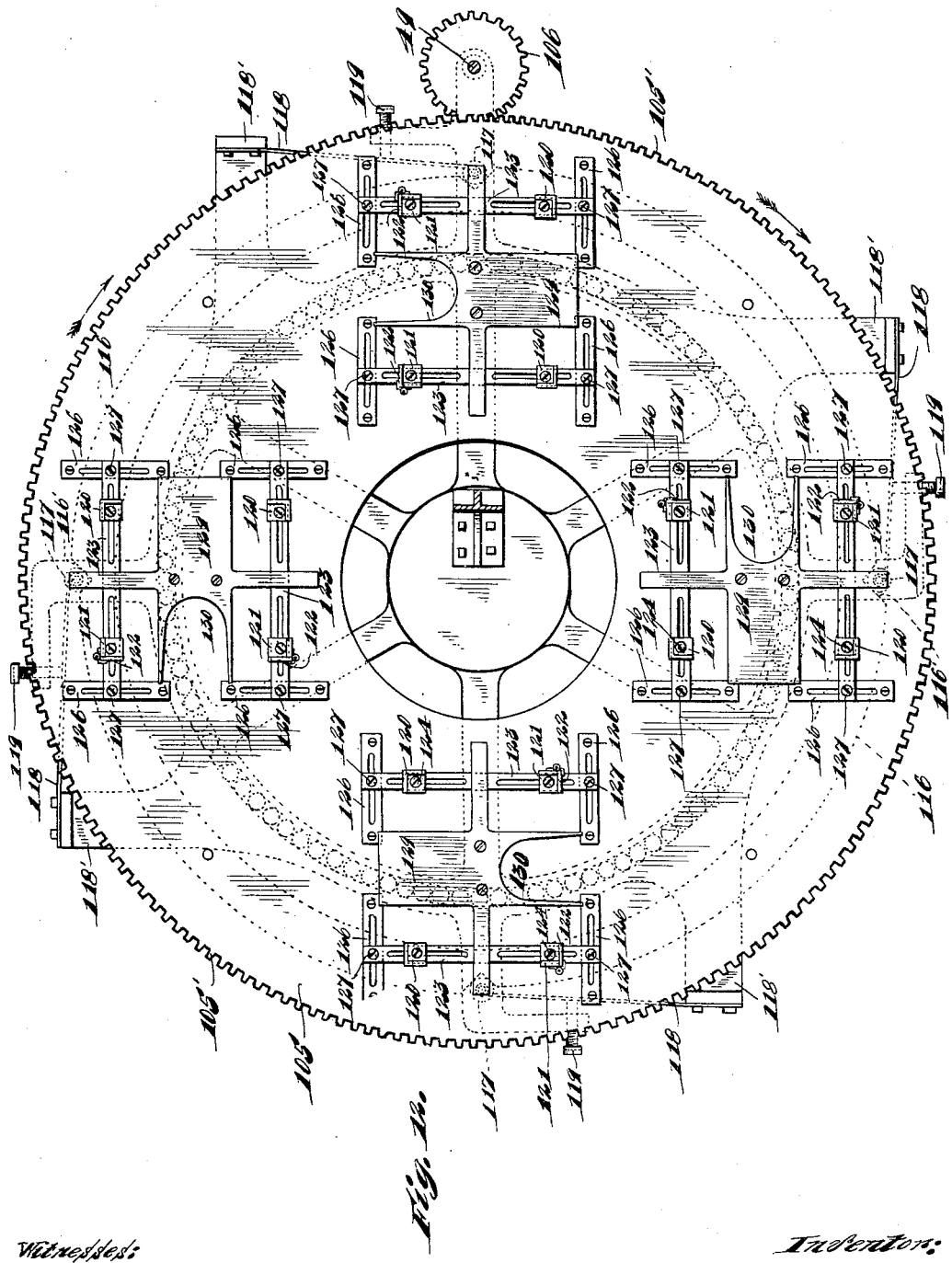

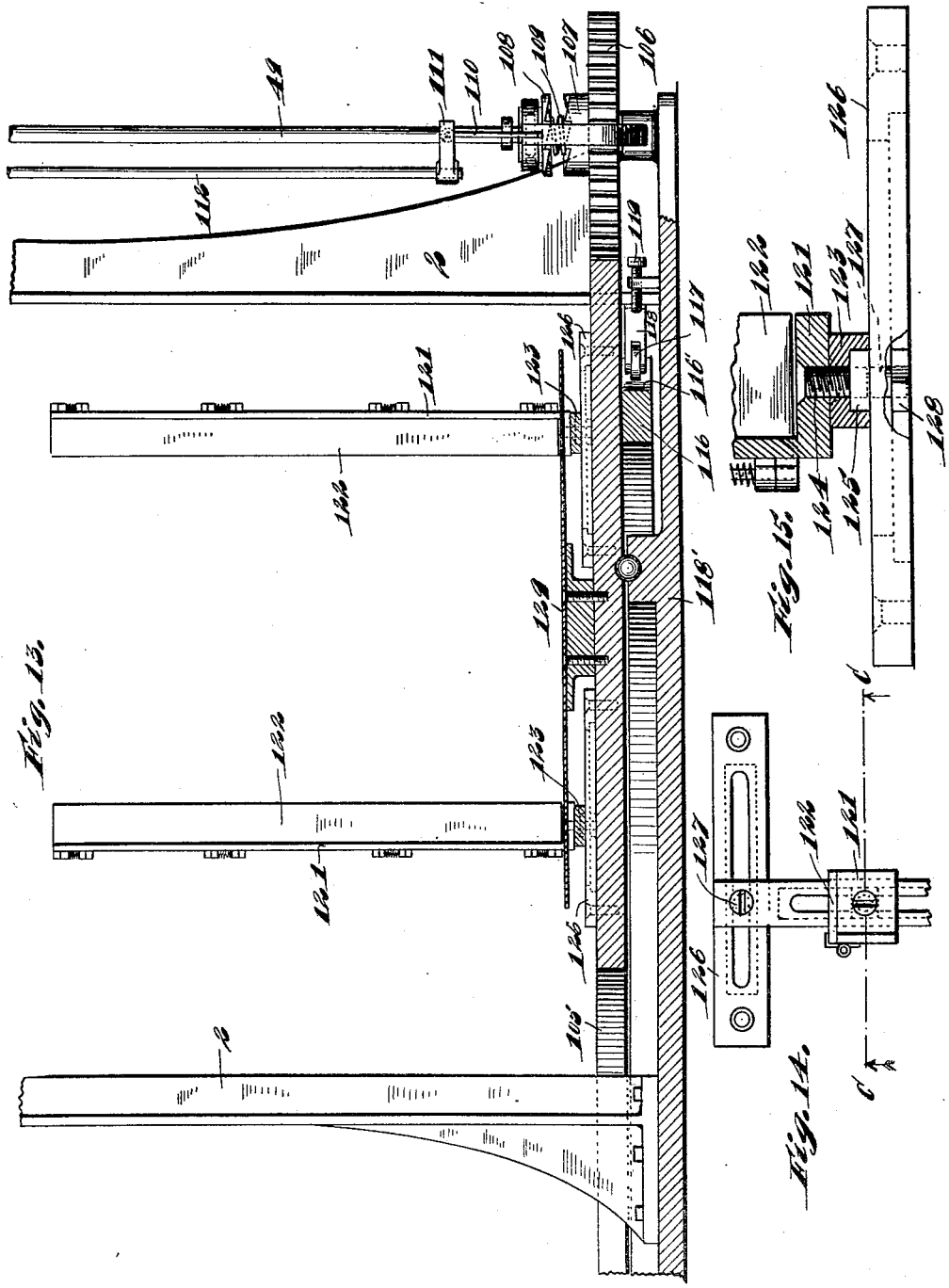

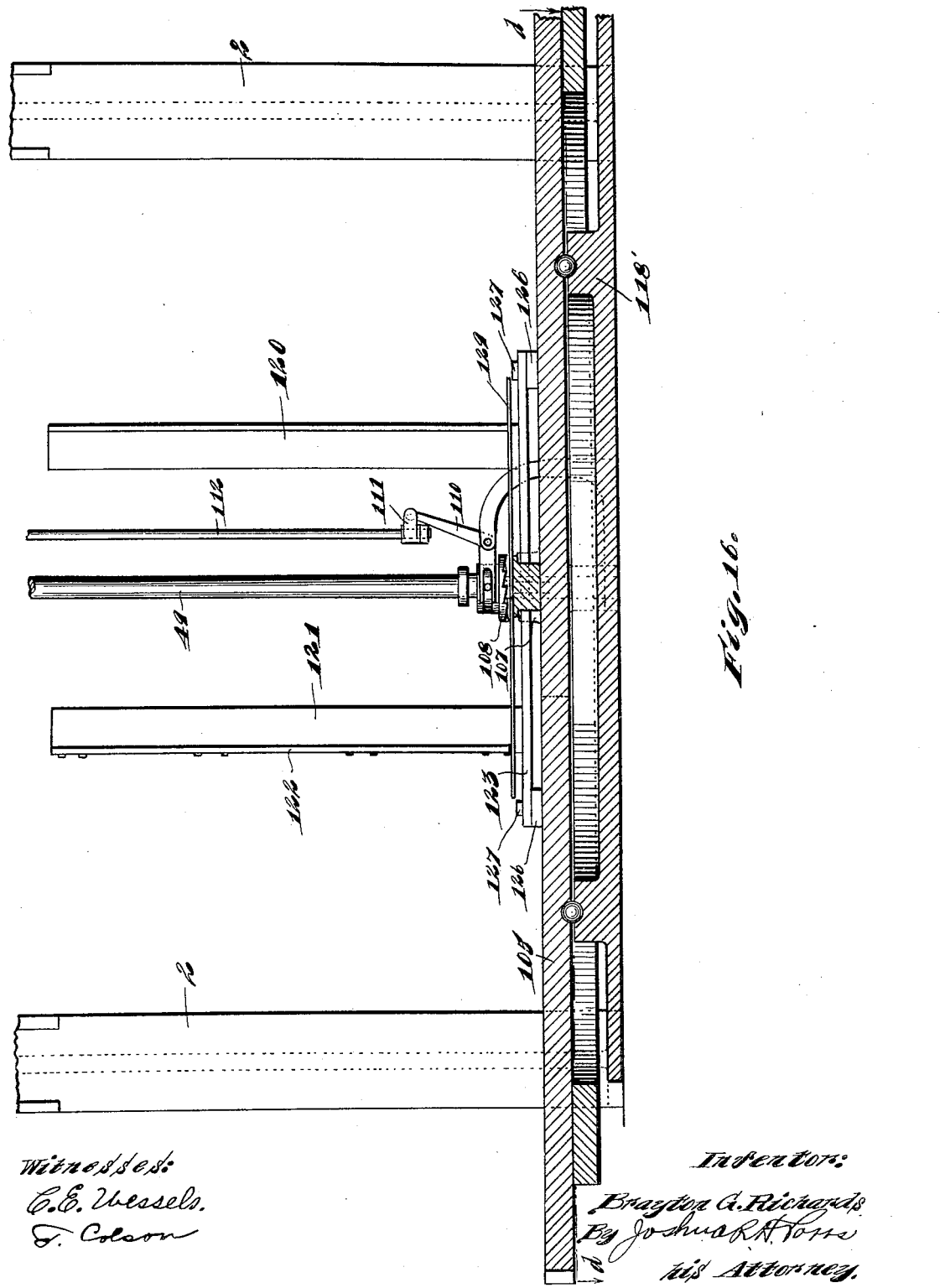

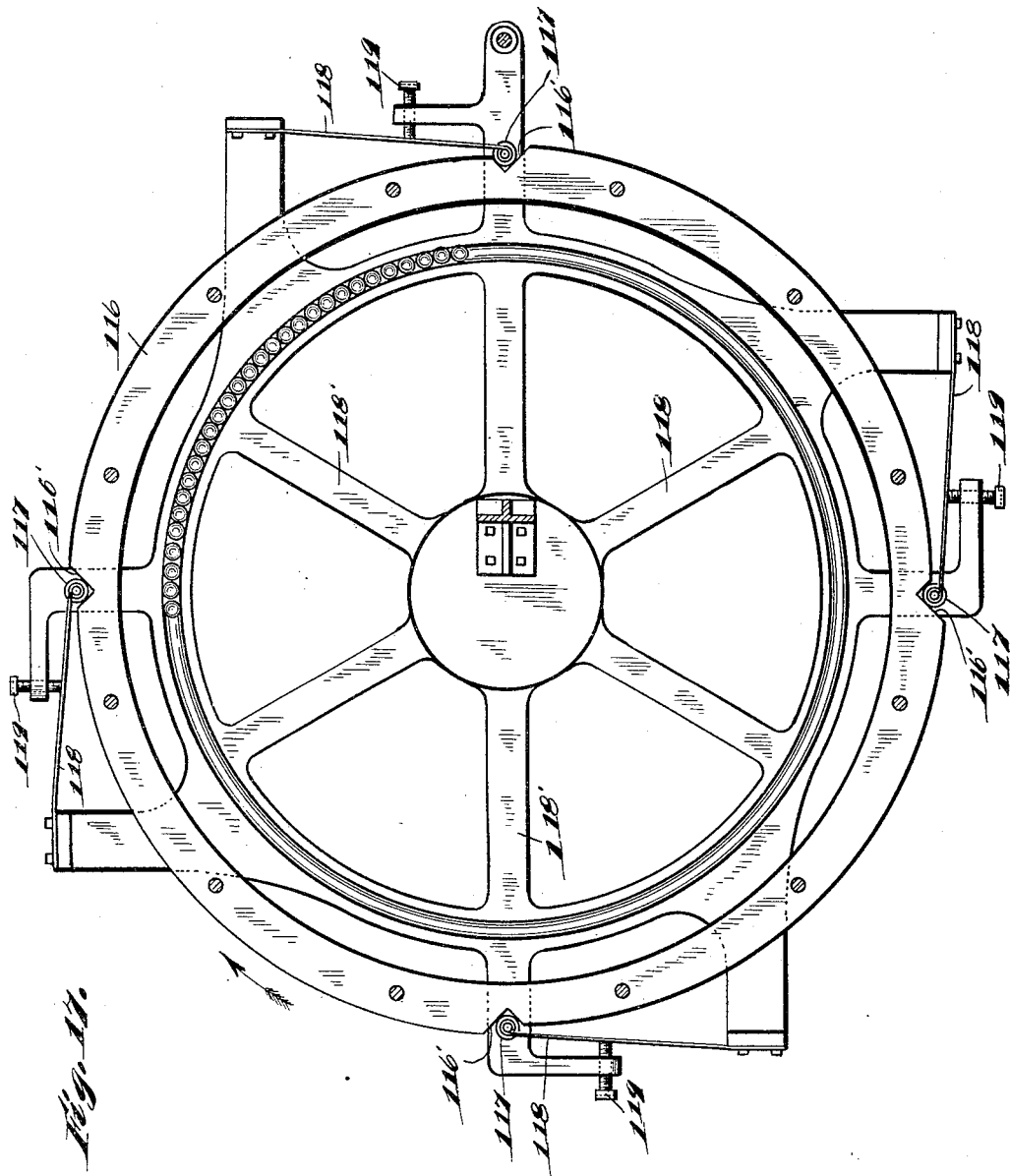

ated December 3rd, 1912.-->

UNITED STATES PATENT OFFICE.

BRAYTON G. RICHARDS, OF CHICAGO, ILLINOIS, ASSIGNOR TO CAREY A. CHESHIRE, OF DES MOINES, IOWA.

STACKING-MACHINE.

1,117,244.

Specification of Letters Patent.

Patented Nov. 17, 1914.

Application filed May 31, 1913. Serial No. 770,982.

*To all whom it may concern:*

Be it known that I, BRAYTON G. RICHARDS, a citizen of the United States, and a resident of the city of Chicago, county of Cook, and State of Illinois, have invented certain new and useful Stacking-Machines, of which the following is a specification.

My invention relates to a certain new and useful stacking machine especially adapted for use in conjunction with book assembling machines and has for its object the provision of a machine of this character which is capable of automatically stacking assembled books with great rapidity and accuracy ready for bundling.

A further object of the invention is the provision of a machine of this character which is of simple construction and efficient in use.

Other objects will appear hereinafter.

The invention consists in the combinations and arrangements of parts hereinafter described and claimed.

Figure 1:
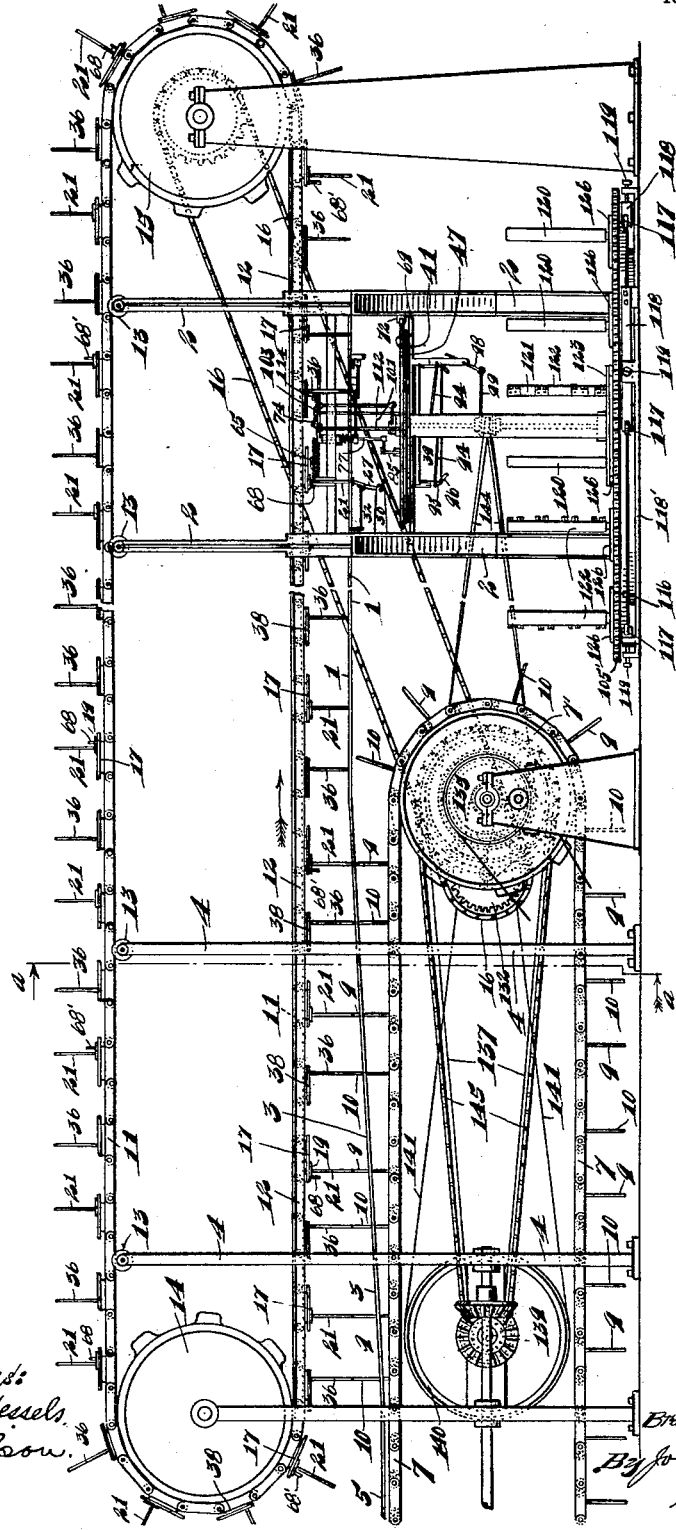
Figure 2:
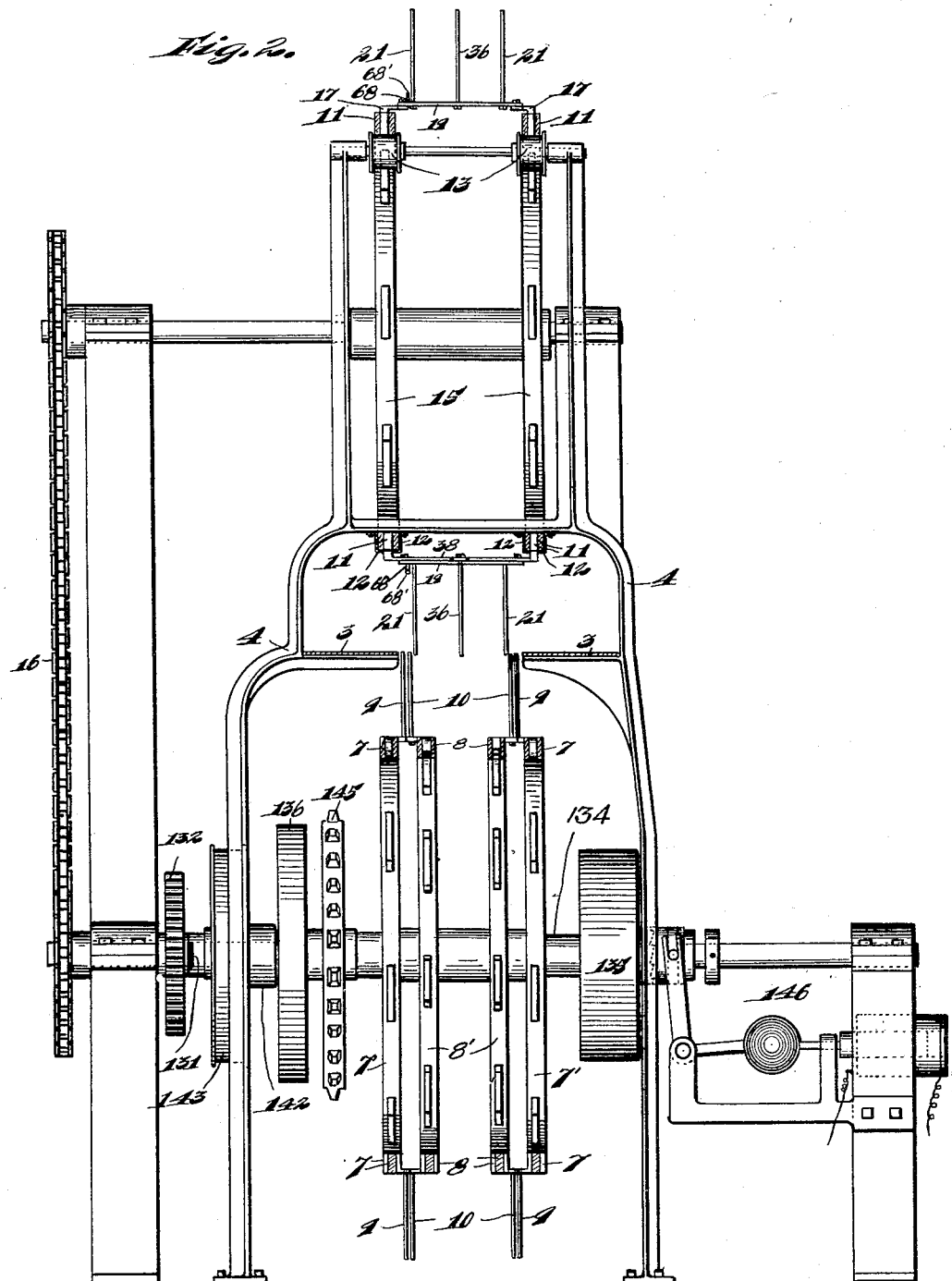
Figure 3:
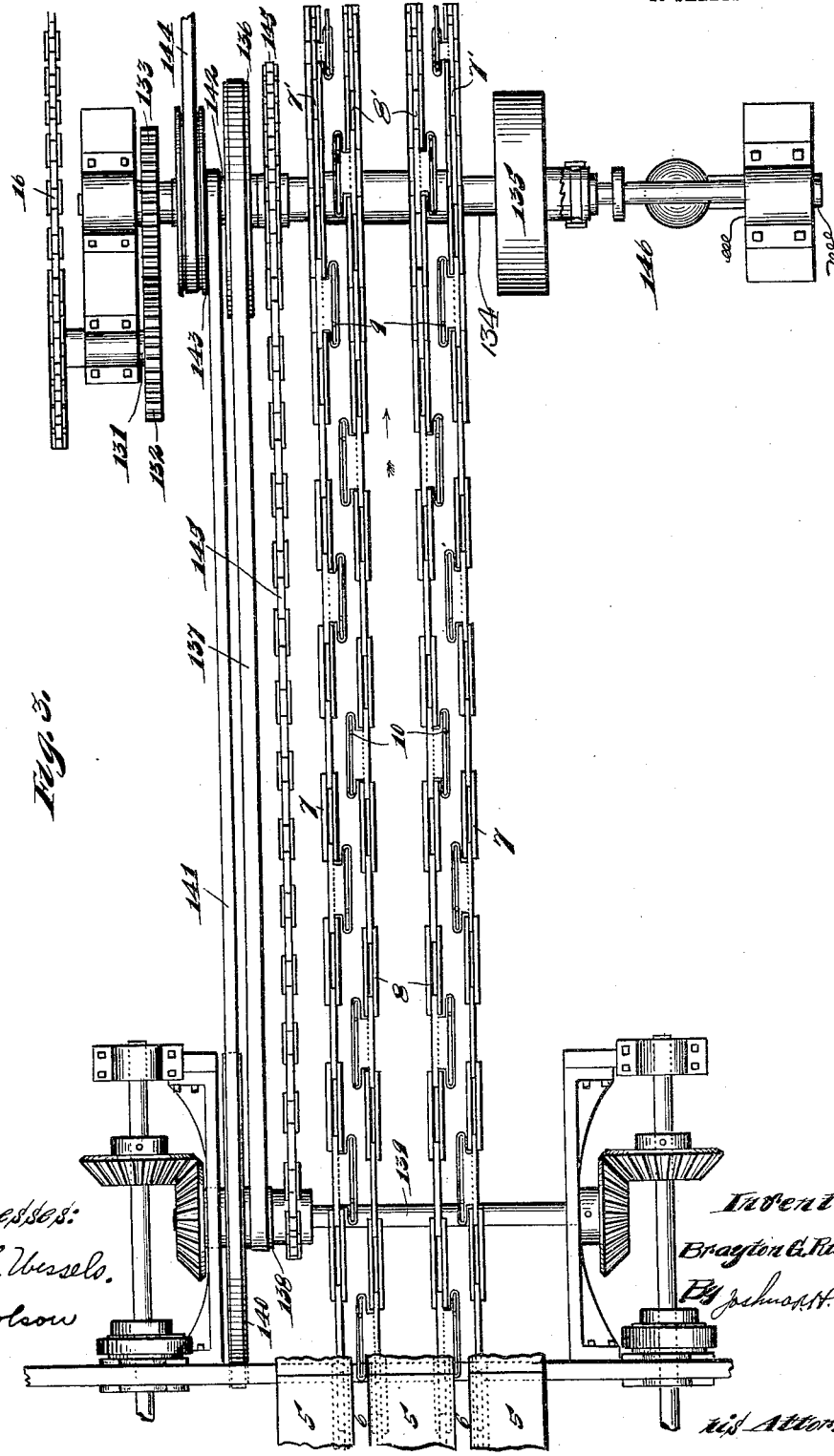
Figure 4:
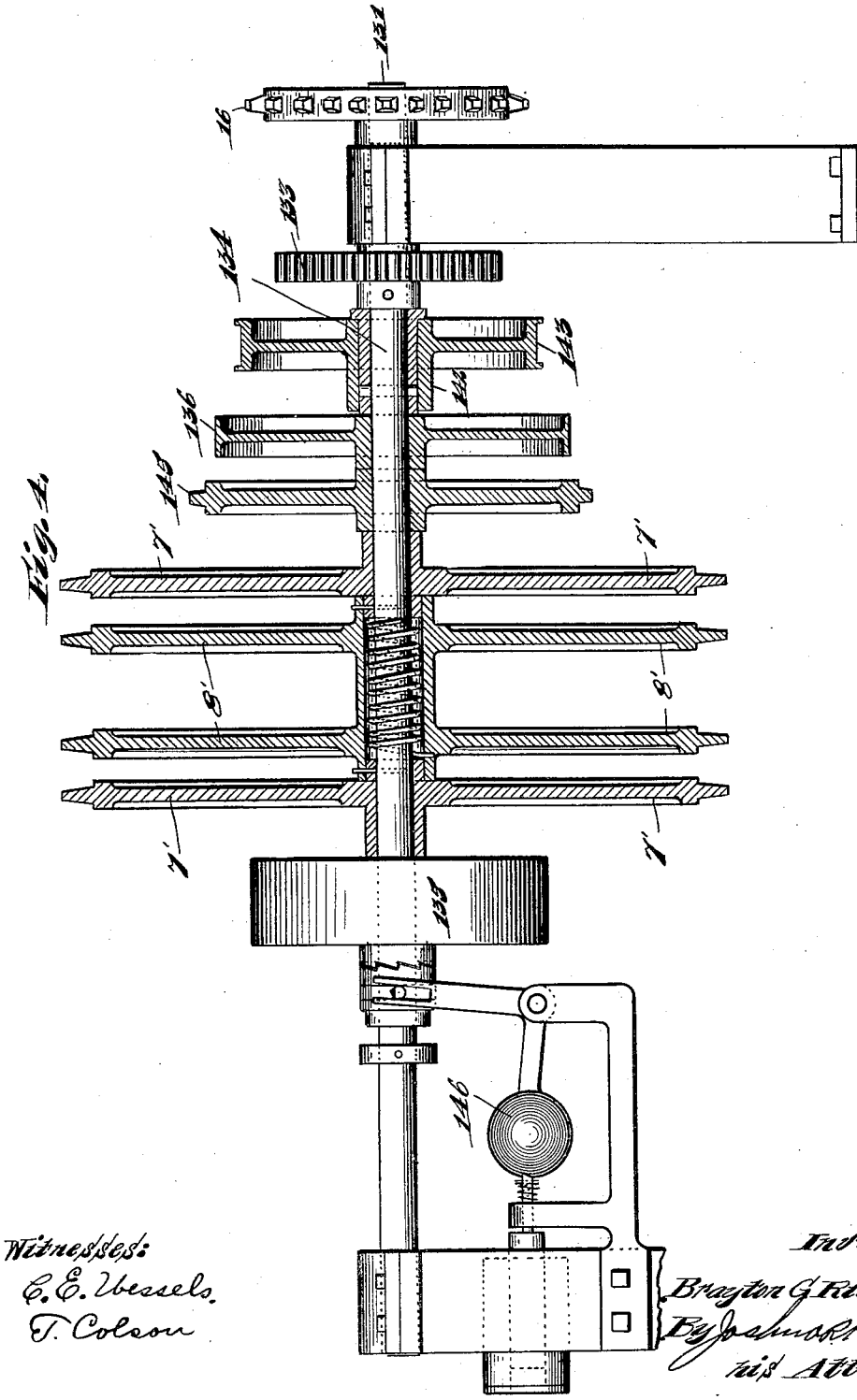
Figure 5:
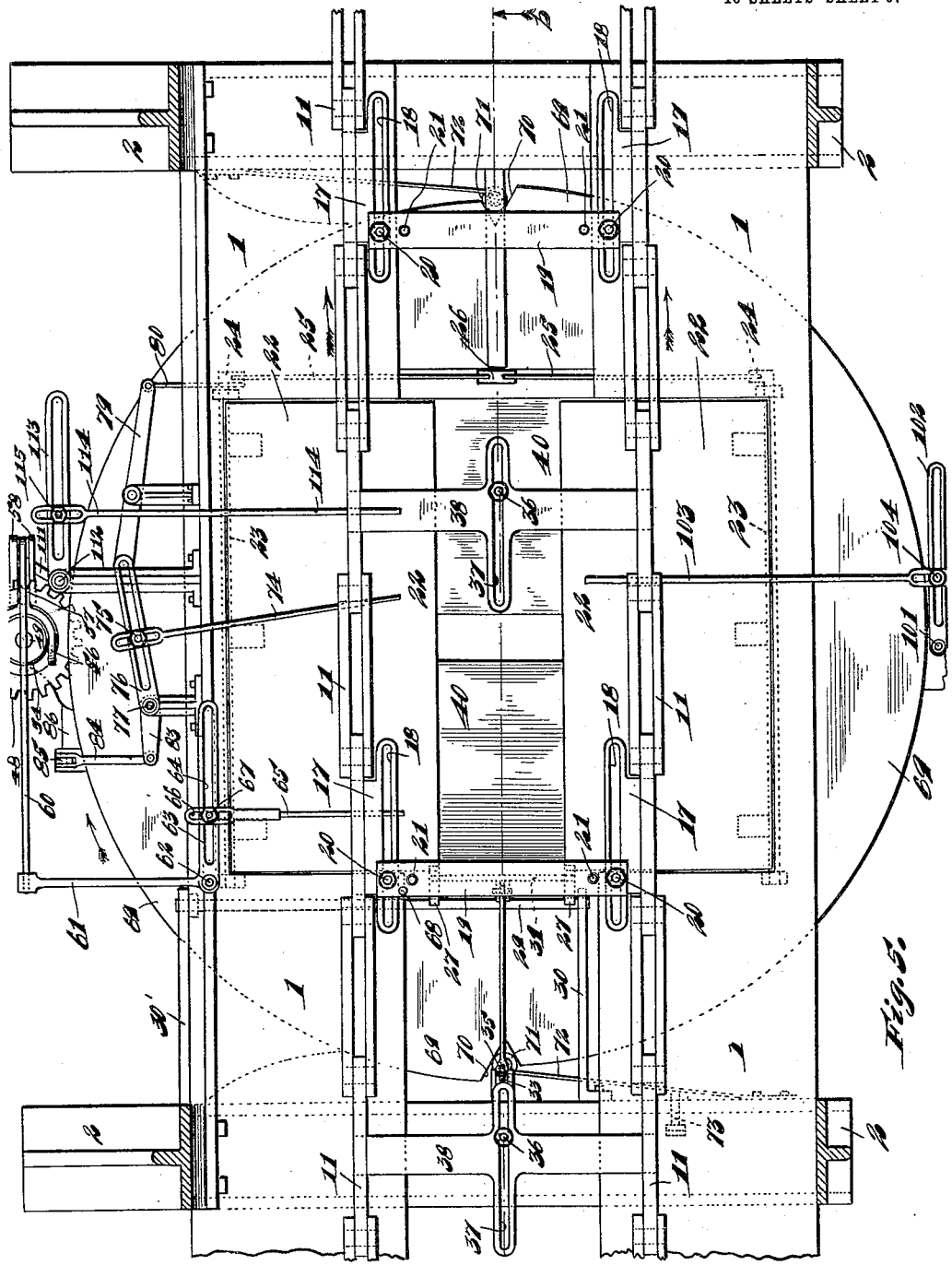
Figure 6:
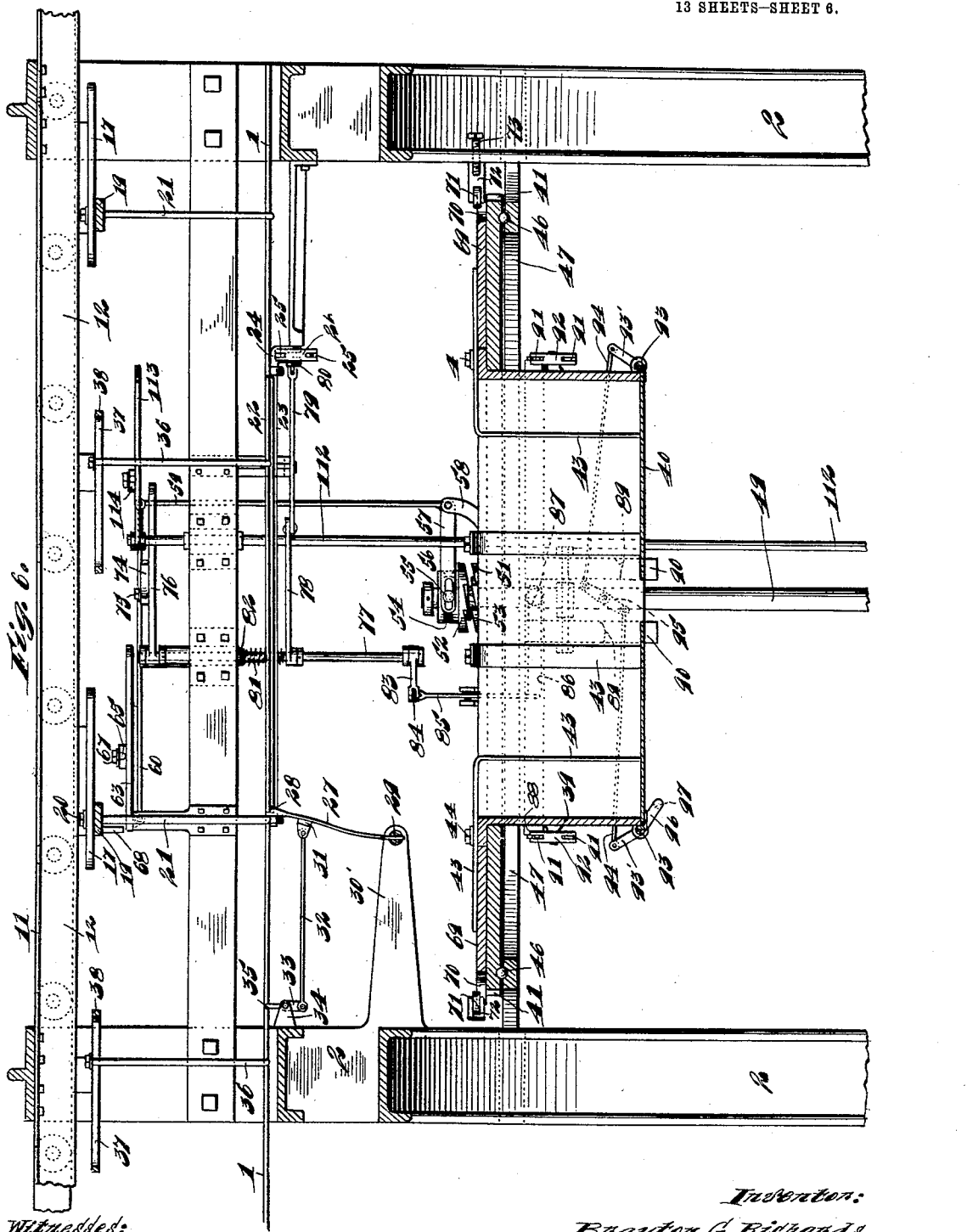
Figure 7:
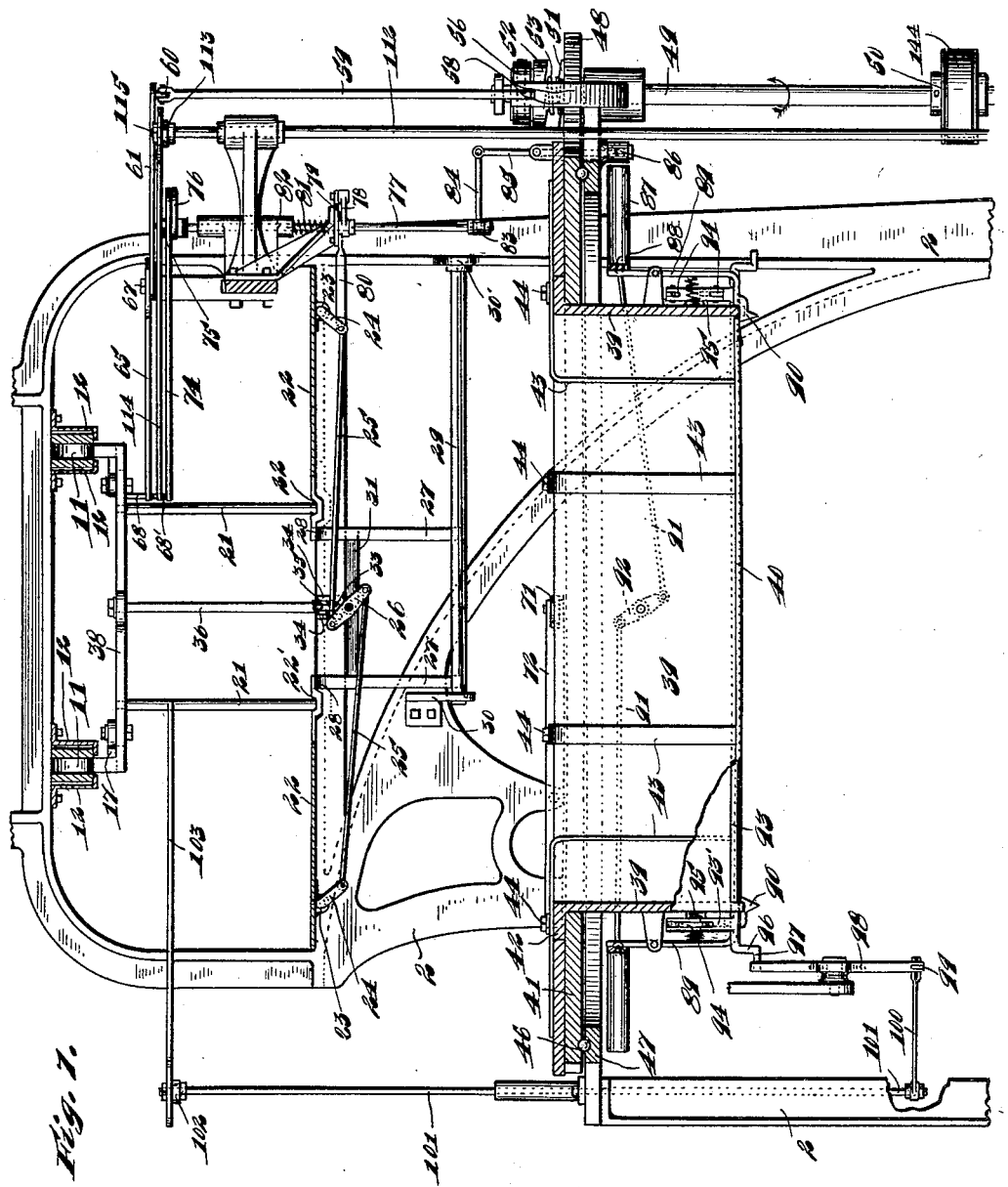

The invention will be best understood by reference to the accompanying drawings forming a part of this specification, and in which, Figure 1 is a partial side view of a machine embodying my invention, Fig. 2, an enlarged section taken on line $a$—$a$ of Fig. 1, Fig. 3, an enlarged top plan view of a portion of the machine with the table portion thereof removed for the sake of clearness and showing the main power shaft and its driving and driven connections, Fig. 4, a sectional view shown partially in elevation taken on the main power shaft of the machine, Fig. 5, an enlarged top plan view of a portion of the machine with portions removed for the sake of clearness and showing the mechanism for discharging the assembled books, Fig. 6, a section taken on line $b$—$b$ of Fig. 5, Fig. 7, a section at right angles to Fig. 6, Fig. 8, a top plan view of a reversing hopper employed in the machine with portions broken away for clearness, Fig. 8$^a$, a detail section of a clutch mechanism employed for operating the reversing hopper, Fig. 9, a side elevation of the reversing hopper, Fig. 10, a horizontal section of the reversing hopper, Fig. 11, an enlarged detail section through one edge of the reversing hopper, Fig. 12, a top plan view of a removing table employed in the machine, Fig. 13, a section taken through the removing table, Fig. 14, an enlarged top plan view showing means for adjusting the size of removing hoppers employed in the machine, Fig. 15, a section taken on line $c$—$c$ of Fig. 14, Fig. 16, a section of the removing table, and Fig. 17, a horizontal section taken immediately under the removing table, on line $d$—$d$ of Fig. 16.

The preferred form of construction as illustrated in the drawings comprises a stacking machine table 1 which is open or longitudinally slotted in its central portion and is suitably supported upon standards or frames 2 as shown. Table 1 is arranged to constitute a continuation of an upwardly inclined table 3 which is longitudinally slotted as indicated and is suitably supported on suitable standards or frames 4, said table 3 being arranged to constitute a continuation of a table 5 which is provided with longitudinal slots 6 and constitutes the supporting table of a book assembling machine. Two pairs of feed chains 7 and 8 are arranged under tables 5 and 3, said chains 7 and 8 being provided with upwardly extending adjustable pins 9 and 10 respectively projecting upwardly through the slots in tables 5 and 3 and arranged to position and feed articles, such as assembled books along said tables.

The book assembling machine, in conjunction with which my invention is illustrated constitutes no part of my invention, the same being the invention of Carey A. Cheshire, and is fully set forth and described in his application for Letters Patent filed May 31, 1913, Serial No. 771,003. Inasmuch as no claim is made herein to the details of said assembling machine, and the details thereof being fully set forth in the said application of the said Carey A. Cheshire, no further description of said assembling machine is needed here, it being sufficient to state that said assembling machine is so arranged and constructed as to assemble the various sections of a book one on top of the other in a pile in book form, on table 5 between the different sets of fingers 9 and 10 and push said assembled books along table 5 and onto the upwardly inclined table 3.

Arranged over table 3 is a pair of sprocket chains 11 the lower portions of which are supported and guided in suitable guides 12 and the upper portions of which are supported and guided by suitable guide rollers 13 mounted on frames 4, as indicated in Figs. 1 and 2. Chains 11 are passed over suitable sprocket wheels 14 and 15 mounted as indicated, sprocket wheel 15 being driven by means of a sprocket chain 16 operatively connected with the main power shaft of the machine, as will be described more fully hereinafter. At suitable intervals transversely registering supporting lugs 17 are secured to the links of chains 11 and are provided with longitudinal slots 18, said lugs serving to support transverse bars 19 which are adjustably secured to said lugs by means of bolts 20. (See Fig. 5.) Each of the bars 19 carries a pair of downwardly projecting pins 21, there being a bar 19 and a pair of the pins 21 arranged to coöperate with the corresponding pins 9 on chains 7, said pins 21 when traveling on the lower portion of sprocket chains 11, being arranged to register transversely with the pins 9 but being out of longitudinal alinement therewith so as to not interfere and said pins 21 being of a length to just overlap the upper ends of pins 9 so as to coöperate therewith to feed the assembled books along the upwardly inclined table 3 as will be readily understood. By this arrangement, it will be observed, that as each assembled book passes onto table 3 under the influence of the corresponding pins 9 the corresponding pins 21 will assume positions in transverse alinement with pins 9 and coöperate therewith to force the assembled book along table 3. As the book proceeds along table 3 it gradually rises to a height above the height of pins 9, the pins 9 will gradually withdraw from contact with the book being fed until said book is completely removed from contact with pins 9 and pins 9 will then be free to continue their travel without interfering with the assembled books. As each book is thus gradually withdrawn from the domination of pins 9, they come under the domination of the corresponding pins 21 until when the books pass onto table 1 they are completely under the domination of pins 21 and entirely free from pins 9.

Arranged in table 1 is a pair of downwardly and outwardly swinging trap doors 22 which are provided with longitudinal grooves 22' which permit of the passage of pins 21 as shown in Fig. 7. Trap doors 22 are each secured to a shaft 23 which is rotatably mounted on the under side of table 1 and is provided at one end with a downwardly extending arm 24. The arms 24 are connected by links 25 with a centrally positioned lever 26 as shown in Fig. 7 so that said trap doors are forced to operate or swing in unison with each other. Trap doors 22 are normally held in supporting positions by means of springs 27 having catches 28 thereon adapted to engage the edges of said trap doors. The springs 27 are rigidly secured to a rod 29 suitably supported in suitable brackets 30 and 30' arranged upon one of the standards 2 as indicated. Springs 27 are rigidly connected together by means of a cross bar 31 which in turn is connected by a link 32 with the lower end of a trip lever 33 mounted in a bracket 34 on standard 2. The upper end 35 of trip lever 33 projects upwardly in the slot in table 1 in the path of the lower ends of a plurality of tripping pins 36 which are adjustably secured in slots 37 in cross bars 38 secured to chains 11 as shown, there being one of the cross bars 38 to correspond with each of the cross bars 19, so that one of the pins 36 is provided to coöperate with each pair of pins 21. By this arrangement it will be observed, that when trip lever 33 is struck by one of the pins 36 it will be operated to withdraw catches 28 to release trap doors 22. Pins 36 are so positioned with respect to the corresponding pins 21 that when an assembled book is positioned centrally on trap doors 22, said trap doors will be tripped to permit said assembled book to fall through table 1. By properly adjusting pins 21 and 36 for different sizes of books, any book fed along table 1 and within the range of adjustments of pins 21 and 36, may be positioned centrally on trap doors 22 and then dropped through table 1.

Arranged immediately below trap doors 22 and positioned centrally with respect thereto is a rectangular hopper 39 which is provided with downwardly swinging trap doors 40 constituting the bottom thereof. Hopper 39 is supported in a gear 41 which is provided with a central rectangular opening for this purpose, said hopper being provided with flanges 42 around its upper edge resting upon gear 41, and said gear being positioned with its axis centrally under trap doors 22. Hopper 39 is provided with a plurality of adjustable angular bars 43 which are adjustably secured to flange 42 by means of bolts 44 taking through slots 45, as shown. Gear 41 is rotatably mounted on ball bearings 46 arranged in an annular support 47 which is suitably mounted in the frame work of the machine as shown. The gear 41 meshes with a pinion 48 which is loosely mounted on a vertical shaft 49 arranged at the rear of the machine and driven through the medium of a flanged pulley 50 as indicated in Fig. 7. Gear 48 carries on its upper side a clutch member 51 which coöperates with a clutch member 52 which is splined or feathered on shaft 49 so as to permit of longitudinal movement of said clutch member while rotating with said shaft 49, a spring 53 being interposed between said clutch members to hold them normally apart.

Clutch member 52 carries a loose collar 54 which is given a slot and pin connection 55 with a fork 56 on the end of the lower arm 57 of a bell crank lever pivoted in a support 58 on the frame of the machine. The other arm 59 of said bell crank lever is connected by means of a link 60 with one arm 61 of a bell crank lever which is pivoted at 62 on the frame of the machine. The other arm 63 of said bell crank is provided with a longitudinal slot 64 and an operating finger 65 is provided with a slot 66 and adjustably secured to arm 63 by means of a bolt 67. Every other one of the cross bars 19 carries a downwardly extending pin 68 or 68′, said pins being positioned in the corresponding cross bar outside of the path of the adjacent pin 21 and in position to contact with the end of finger 65 as the corresponding bar 19 travels by said finger. The pins 68′ are somewhat longer than the pins 68 and alternate therewith, for a purpose which will be explained hereinafter. By this arrangement, it will be observed that as each of the pins 68—68′ passes the finger 65, said finger will be operated to rock bell crank 61—63 which in turn will operate bell crank 57—59 to throw clutch 52 into engagement with clutch 51 and thus place pinion 48 under the domination of shaft 49. This will cause rotation of gear 41 and consequently of hopper 39. By adjusting the position of finger 65 longitudinally with respect to trap doors 22, the time at which hopper 39 will be rotated may be regulated within the range of said adjustment and by adjusting said finger on arm 63, the time during which said finger will be operated to place said hopper 39 under the domination of shaft 49 may also be regulated.

A cam member 69 is secured to the top of gear 41 and is provided with diametric V-shaped notches 70 which are adapted to receive rollers 71 which are carried by springs 72 suitably mounted on the frame of the machine and adjustable by means of set screws 73. The cam member 69 is shaped so that its outer periphery gradually rises or increases in width from each of the notches 70 to the other and oppositely to the direction of rotation of gear 41. By this arrangement, it will be observed, that when gear 41 is rotated as described above, the rollers 71 will ride out of the corresponding notches 70 and ride upon the corresponding cam surfaces of the cam 69, and thus tend to stop or check the rotation of gear 41 and hopper 39. The finger 65 is so adjusted as to hold clutch members 51 and 52 in engagement until a partial rotation of said gear and hopper have been effected and enough momentum imparted thereto to continue the rotation until notches 70 arrive opposite rollers 71 which thereupon snap into said notches to position said hopper under said trap doors after having completed exactly one-half of a rotation, such a result being rendered obtainable by the various adjustments afforded as set forth above.

As explained above the pins 68 and 68′ are only placed on every other one of the cross bars 19 so that this half rotation of hopper 39 only occurs after every other assembled book has been dropped therein from trap doors 22, so that when said assembled books are delivered from said hopper they will be delivered alternately in reversed positions.

Another operating finger 74 is adjustably secured to an arm 76 rigidly connected with a vertical shaft 77 arranged at the rear of the machine, said finger 74 having its outer or free end set in the path of the pins 21 on the corresponding side of the machine. By adjusting the extent of the projection of finger 74 and its longitudinal position on arm 76, it will be observed that the time of the contact of said finger with the corresponding pin 21 may be regulated and also the extent of the movement of said finger. Shaft 77 carries an arm 78 which is operatively connected with a lever 79 in turn connected by means of a link 80 with the arm 24 on the corresponding shaft 23. A coil spring 81 has one of its ends secured to shaft 77 and its other end secured to the shaft bearing 82, said spring being so coiled and arranged as to tend to rotate shaft 77 to facilitate the fall of trap doors 22 and also to move finger 74 in the direction opposite to that effected by its contact with the corresponding pin 21. By this arrangement it will be observed that when trap doors 22 fall to permit the passage of an assembled book, finger 74 will be swung into the path of the corresponding pins 21 so that as the next corresponding pin 21 passes the position of finger 74, it will engage said finger and rotate shaft 77 to cause operation of lever 79 to reset the trap doors 22, said trap doors being automatically engaged by spring catches 28 and held in their normal supporting positions. By properly adjusting finger 74 on arm 76 the time at which the resetting of the trap doors takes place may be adjusted to accommodate different sizes of books. Shaft 77 also carries an arm 83 which is connected by a link 84 with the upper end of a lever 85 suitably mounted on the frame of the machine. The lower end of lever 85 is operatively connected with another lever 86 which is arranged in operative relation with outwardly extending pins or projections 87 carried by cross bars 88 arranged at opposite sides of hopper 39.

Each of the cross bars 88 is rigidly secured to two spring-held latching members 89, said latching members being provided with catches 90 adapted to engage under the edges of trap doors 40 to hold said trap doors normally in elevated or supporting positions. The bars 88 are operatively connected at their ends by means of links 91 connected with levers 92 so as to cause said spring-held latching members 89 to operate in unison with each other. By this arrangement, it will be observed that when trap doors 22 are reset by the action of finger 74, arm 83 will operate through the medium of link 84 and levers 85 and 86 to press one of the pins 87 inwardly to cause the latches 89 to release trap doors 40 and permit the discharge of an assembled book in hopper 39.

Each of the trap doors 40 is secured to a shaft 93 which is rotatably mounted on the corresponding side of hopper 39 adjacent to the bottom thereof as indicated. Each of the shafts 93 carries arms 93' which are operatively connected with the corresponding arms on the other shaft by means of links 94 and lever 95 so as to cause operation of said trap doors in unison with each other. Each of the shafts 93 also carries an arm 96 having outwardly turned pins 97 at their lower ends, said arms 96 and pins 97 being arranged at opposite ends of the shafts 93 and diametrically opposite each other with respect to the center of rotation of hopper 39. A lever 98 is pivotally mounted on the frame of the machine in operative relation with one of the pins 97, so that when said trap doors are tripped and swing downwardly one of the pins 97 will swing into contact with the upper end of lever 98 so as to be operable thereby. Lever 98 is connected by means of a link 99 with an arm 100 which is rigidly secured to the lower end of a vertical shaft 101 arranged in the frame at the front side of the machine. Shaft 101 carries a slotted arm 102 to which an operating finger 103 is adjustably secured by means of a bolt 104, the outer end of the finger 103 being set in the path of the pins 21 on the corresponding side of the machine. By this arrangement it will be observed that as the pins 21 on the corresponding side of the machine pass finger 103, said finger will be rocked to cause rocking of shaft 101 and consequent operation of lever 98 to reset trap doors 40, and that by adjusting finger 103 on arm 102 the time at which said trap doors will be reset may be varied to accommodate different sizes of assembled books.

A rotatable delivering table 105 is arranged with one edge under hopper 39 and is provided on its periphery with a gear 105'. A pinion 106 which is loosely mounted on shaft 49 meshes with gear 105' and serves to rotate said gear and table 105. Gear 106 is provided with a clutch member 107 coöperating with a clutch member 108 splined on shaft 49 and normally held out of engagement with clutch member 107 by means of a spring 109. The clutch members 107 and 108 operate in precisely the same manner as clutch members 51 and 52 and need no further description here. Clutch member 108 is operatively connected with a bell crank lever 110 which in turn is operatively connected with an arm 111 carried by a vertical shaft 112 suitably mounted at the rear of the machine. Shaft 112 carries a slotted arm 113 to which an operating finger 114 is adjustably secured by means of a bolt 115. The outer end of finger 114 is set in the path of the lower ends of the pins 68', said finger 114 being set slightly lower than finger 65, so that pins 68', which are slightly longer than pins 68 will contact with finger 114 but pins 68 will not contact therewith. Thus, it will be observed, that finger 114 will be operated as every fourth bar 19 passes over trap doors 22. Operation of finger 114 by pin 68' causes rocking of shaft 112 and consequent shifting of clutch 108 into engagement with clutch 107 thus causing rotation of table 105. By adjusting finger 114 on arm 113, the time at which the rotation of table 105 is effected and the extent of such rotation may be varied within the range of such adjustments. Inasmuch as the pins 68' occur on every fourth bar 19, and there is one of said bars for every assembled book delivered to hopper 39 and thence to table 105, it will be observed, that after the delivery of four books to said table, said table will be rotated as above described. By varying the distances apart of the longer pins 68' the number of books delivered to table 105 between each movement thereof may be varied as desired.

Table 105 carries a cam member 116 which is provided with four V-shaped notches 116' located in its periphery ninety degrees apart. Rollers 117 are carried by the free ends of springs 118 which are suitably secured to a base plate 118' arranged under table 105, and the tension of springs 118 is rendered adjustable by means of set screws 119, as shown in Fig. 17. The periphery of cam member 116 is shaped to gradually rise or increase in diameter from each notch 116' to the next notch 116' reversely with respect to the rotation of said cam member. By this arrangement it will be observed that when table 105 commences to rotate as above explained, the rollers 117 will ride out of notches 116' and ride upon cam surfaces of cam member 116 so as to effect a braking or stopping action on table 105. By properly adjusting finger 114 and springs 118, the parts may be adjusted so that at each operation of finger 114 table 105 will be caused to run through a quarter of a revolution and then be stopped and accurately positioned by means of spring rollers 117 as will be readily understood.

A plurality of receiving hoppers are formed on table 105 in position to receive the assembled books dropped from reversing hopper 39 as explained above, each of said hoppers being so positioned as to come into registration with the hopper 39 after each one-fourth revolution of the table 105 as explained above. Each of said receiving hoppers consists of four upstanding angle irons 120 and 121, the angle irons 121 being arranged at the rear of each hopper with respect to the direction of rotation of table 105 and the rear leg 122 thereof being mounted on spring hinges which permit of rearward swinging thereof so as to facilitate the removal of books from said receiving hoppers. Each pair of angle irons 120 and 121 is adjustably secured on slotted bars 123 by means of a screw bolt 124 which engages a threaded block or nut 125 sliding in a T-slot in bar 123 as indicated in Figs. 14 and 15. By this arrangement it will be observed that the corresponding angle irons in each receiving hopper may be adjusted toward and away from each other. Bars 123 are adjustably secured to slotted plates 126 by means of screw bolts 127 engaging threaded blocks or nuts 128 sliding in a T-slot in plates 126 as shown in Figs. 12, 14 and 15. By this arrangement it will be observed that the angle irons 120 and 121 may be adjusted to different sizes of books delivered from hopper 39.

Arranged in the bottom of each of the receiving hoppers is an irregularly shaped supporting member 129 which is positioned above the top of table 105 and is arranged to support a pile of assembled books in the corresponding hopper above the top of table 105, and at the same time permit of the adjustments of angle irons 120 and 121 above described. At its rear, support 129 is provided with a notch 130 adapted to permit the insertion of the hand of an operator to facilitate removal of the pile of books from said receiving hoppers.

As mentioned above the machine is driven by a sprocket chain 16 on a shaft 131 which is in turn driven through gears 132 and 133 from the main power shaft 134 of the machine, said power shaft being driven by power belt 135. Shaft 134 also carries a pulley 136 which is connected by a belt 137 with a small pulley 138 loosely mounted on a shaft 139. Pulley 138 is secured to a large pulley 140 which is connected by a belt 141 with a small pulley 142 loosely mounted on shaft 134. Pulley 142 is secured to a larger pulley 143 which in turn is connected by a twisted belt 144 with pulley 50 on shaft 49. By this arrangement, it will be observed that sprocket wheels 15 will be properly operated to drive chains 11 and shaft 49 rotated at a high rate of speed. A sprocket chain 145 connects shafts 134 and 139, and shaft 139 is employed to operate the book assembling machine mentioned above as being the invention of Carey A. Cheshire, which it is thought needs no further description here. An automatic stopping mechanism 146 is also mounted on shaft 134 which is connected with and operated by the book assembling machine as explained in the application of the said Carey A. Cheshire, but inasmuch as this automatic stopping mechanism constitutes no part of my invention it needs no further description here.

The stacking machine above described will stack assembled books whether fed thereto by hand or other mechanism with great rapidity and in alternately reversed positions so that the same may be readily bundled in an ordinary bundling press. By alternately reversing the assembled books the folded edges thereof, which are naturally somewhat thicker than the other edges, alternate with said other edges thus preserving an even pile and greatly facilitating the bundling and storage of said bundled books.

While I have illustrated and described the preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A stacking machine comprising a conveyer; means for removing articles from said conveyer; means for reversing the position of every other one of said articles; and means for placing a plurality of said articles adjacent each other, substantially as described.

2. A stacking machine comprising a conveyer; means for causing articles to fall through said conveyer; means for reversing the position of every other one of said articles; and means for placing a plurality of said articles adjacent each other, substantially as described.

3. A stacking machine comprising a conveyer; means for causing articles to fall through said conveyer; means for reversing the position of every other one of said articles; and means for catching a plurality of said articles in a pile, substantially as described.

4. A stacking machine comprising a conveyer; means for causing articles to fall through said conveyer; means for reversing the position of every other one of said articles; means for catching a plurality of said articles in a pile; and means for removing said pile, substantially as described.

5. A stacking machine comprising a supporting table; means for pushing articles along said table; means for removing articles from said table; means for reversing the position of every other one of said articles; and means for placing a plurality of articles adjacent each other, substantially as described.

6. A stacking machine comprising a supporting table; means for pushing articles along said table; means for causing articles to fall through said table; means for reversing the position of every other one of said articles; means for catching a plurality of said articles in a pile; and means for removing said pile, substantially as described.

7. A stacking machine comprising a supporting table; a traveling member arranged above said table; downwardly projecting members on said traveling member arranged to contact with and push articles along said table; means for removing articles downwardly from said table; and means for reversing every other one of said articles, substantially as described.

8. A stacking machine comprising a supporting table; a traveling member arranged above said table; downwardly projecting members on said traveling member arranged to contact with and push articles along said table; means for causing articles to fall through said table; and means for reversing every other one of said articles, substantially as described.

9. A stacking machine comprising a supporting table; a traveling member arranged above said table; downwardly projecting members on said traveling member arranged to contact with and push articles along said table; trap doors arranged in said table; and automatic means for tripping said trap doors to permit the fall of said articles, substantially as described.

10. A stacking machine comprising a supporting table; a traveling member arranged above said table; downwardly projecting members on said traveling member arranged to contact with and push articles along said table; trap doors arranged in said table; automatic means for tripping said trap doors to permit the fall of said articles; and automatic means for resetting said trap doors after each operation thereof, substantially as described.

11. A stacking machine comprising a supporting table; a traveling member arranged above said table; downwardly projecting members on said traveling member arranged to contact with and push articles along said table; trap doors arranged in said table; and automatic means operable by said traveling member, for tripping said trap doors to permit the fall of said articles, substantially as described.

12. A stacking machine comprising a supporting table; a traveling member arranged above said table; downwardly projecting members on said traveling member arranged to contact with and push articles along said table; trap doors arranged in said table; automatic means operable by said traveling member, for tripping said trap doors to permit the fall of said articles; and automatic means, operable by said traveling member, for resetting said trap doors after each operation thereof, substantially as described.

13. A stacking machine comprising a supporting table; a traveling member arranged above said table; downwardly projecting members on said traveling member arranged to contact with and push articles along said table; trap doors arranged in said table; automatic means for tripping said trap doors to permit the fall of said articles; means for catching each fallen article separately; means for rotating said catching means one-half of a rotation after the fall of every other one of said articles; and means for releasing said caught articles, substantially as described.

14. A stacking machine comprising a supporting table; a traveling member arranged above said table; downwardly projecting members on said traveling member arranged to contact with and push articles along said table; trap doors arranged in said table; automatic means for tripping said trap doors to permit the fall of said articles; automatic means for resetting said trap doors after each operation thereof; means for catching each fallen article separately; means for rotating said catching means one-half of a rotation after the fall of every other one of said articles; and means for releasing said caught articles, substantially as described.

15. A stacking machine comprising a supporting table; a traveling member arranged above said table; downwardly projecting members on said traveling member arranged to contact with and push articles along said table; trap doors arranged in said table; automatic means operable by said traveling member, for tripping said trap doors to permit the fall of said articles; means for catching each fallen article separately; means for rotating said catching means one-half of a rotation after the fall of every other one of said articles; and means for releasing said caught articles, substantially as described.

16. A stacking machine comprising a supporting table; a traveling member arranged above said table; downwardly projecting members on said traveling member arranged to contact with and push articles along said table; trap doors arranged in said table; automatic means operable by said traveling member, for tripping said trap doors to permit the fall of said articles; automatic means, operable by said traveling member, for resetting said trap doors after each operation thereof; means for catching each fallen article separately; means for rotating said catching means one-half of a rotation after the fall of every other one of said articles; and means for releasing said caught articles, substantially as described.

17. A stacking machine comprising a supporting table; a traveling member arranged above said table; downwardly projecting members on said traveling member arranged to contact with and push articles along said table; trap doors arranged in said table; automatic means for tripping said trap doors to permit the fall of said articles; means for catching each fallen article separately; automatic means, operable by said traveling member, for rotating said catching means one-half of a rotation after the fall of every other one of said articles; and automatic means, operable by said traveling member, for releasing said caught articles, substantially as described.

18. A stacking machine comprising a supporting table; a traveling member arranged above said table; downwardly projecting members on said traveling member arranged to contact with and push articles along said table; trap doors arranged in said table; automatic means for tripping said trap doors to permit the fall of said articles; automatic means for resetting said trap doors after each operation thereof; means for catching each fallen article separately; automatic means, operable by said traveling member, for rotating said catching means one-half of a rotation after the fall of every other one of said articles; and automatic means, operable by said traveling member, for releasing said caught articles, substantially as described.

19. A stacking machine comprising a supporting table; a traveling member arranged above said table; downwardly projecting members on said traveling member arranged to contact with and push articles along said table; trap doors arranged in said table; automatic means operable by said traveling member, for tripping said trap doors to permit the fall of said articles; means for catching each fallen article separately; automatic means, operable by said traveling member, for rotating said catching means one-half of a rotation after the fall of every other one of said articles; and automatic means, operable by said traveling member, for releasing said caught articles, substantially as described.

20. A stacking machine comprising a supporting table; a traveling member arranged above said table; downwardly projecting members on said traveling member arranged to contact with and push articles along said table; trap doors arranged in said table; automatic means operable by said traveling member, for tripping said trap doors to permit the fall of said articles; automatic means, operable by said traveling member, for resetting said trap doors after each operation thereof; means for catching each fallen article separately; automatic means, operable by said traveling member, for rotating said catching means one-half of a rotation after the fall of every other one of said articles; and automatic means, operable by said traveling member, for releasing said caught articles, substantially as described.

21. A stacking machine comprising a conveyer; means for causing articles to fall from said conveyer; a rotatable member arranged to catch each fallen article; automatic means for rotating said catching member one-half of a rotation after the fall of every other article; and means for releasing said caught articles, substantially as described.

22. A stacking machine comprising a conveyer; means for causing articles to fall from said conveyer; a rotatable member arranged to catch each fallen article; automatic means, operable by said conveyer, for rotating said catching member one-half of a rotation after the fall of every other article; and means for releasing said caught articles, substantially as described.

23. A stacking machine comprising a conveyer; means for causing articles to fall from said conveyer; a rotatable member arranged to catch each fallen article; automatic means for rotating said catching member one-half of a rotation after the fall of every other article; trap doors for said catching member; and automatic means for tripping said trap doors to permit the fall of said articles, substantially as described.

24. A stacking machine comprising a conveyer; means for causing articles to fall from said conveyer; a rotatable member arranged to catch each fallen article; automatic means, operable by said conveyer, for rotating said catching member one-half of a rotation after the fall of every other article; trap doors for said catching member; and automatic means for tripping said trap doors to permit the fall of said articles, substantially as described.

25. A stacking machine comprising a conveyer; means for causing articles to fall from said conveyer; a rotatable member arranged to catch each fallen article; automatic means for rotating said catching member one-half of a rotation after the fall of every other article; trap doors for said 26. A stacking machine comprising a conveyer; means for causing articles to fall from said conveyer; a rotatable member arranged to catch each fallen article; automatic means, operable by said conveyer, for rotating said catching member one-half of a rotation after the fall of every other article; trap doors for said catching member; and automatic means, operable by said conveyer, for tripping said trap doors to permit the fall of said articles, substantially as described.

27. A stacking machine comprising a conveyer; means for causing articles to fall from said conveyer; a rotatable member arranged to catch each fallen article; automatic means for rotating said catching member one-half of a rotation after the fall of every other article; trap doors for said catching member; automatic means for tripping said trap doors to permit the fall of said articles; and automatic means for resetting said trap doors after the fall of each article therefrom, substantially as described.

28. A stacking machine comprising a conveyer; means for causing articles to fall from said conveyer; a rotatable member arranged to catch each fallen article; automatic means, operable by said conveyer, for rotating said catching member one-half of a rotation after the fall of every other article; trap doors for said catching member; automatic means for tripping said trap doors to permit the fall of said articles; and automatic means for resetting said trap doors after the fall of each article therefrom, substantially as described.

29. A stacking machine comprising a conveyer; means for causing articles to fall from said conveyer; a rotatable member arranged to catch each fallen article; automatic means, operable by said conveyer, for rotating said catching member one-half of a rotation after the fall of every other article; trap doors for said catching member; automatic means, operable by said conveyer, for tripping said trap doors to permit the fall of said articles; and automatic means, operable by said conveyer, for resetting said trap doors after the fall of each article therefrom, substantially as described.

30. A stacking machine comprising a supporting table; a traveling member arranged above said table; downwardly projecting members on said traveling member arranged to contact with and push articles along said table; trap doors arranged in said table; automatic means for tripping and resetting said trap doors to permit the fall of said articles; a rotatable member arranged to catch each fallen article; automatic means for rotating said catching member one-half of a rotation after the fall of every other article; trap doors for said catching member; and automatic means for tripping and resetting said last mentioned trap doors, substantially as described.

31. A stacking machine comprising a supporting table; a traveling member arranged above said table; downwardly projecting members on said traveling member arranged to contact with and push articles along said table; trap doors arranged in said table; automatic means, operable by said traveling member, for tripping and resetting said trap doors to permit the fall of said articles; a rotatable member arranged to catch each fallen article; automatic means, operable by said traveling member, for rotating said catching member one-half of a rotation after the fall of every other article; trap doors for said catching member; and automatic means, operable by said traveling member, for tripping and resetting said last mentioned trap doors, substantially as described.

32. A stacking machine comprising a supporting table; a traveling member arranged above said table; downwardly projecting members on said traveling member arranged to contact with and push articles along said table; trap doors arranged in said table; automatic means for tripping and resetting said trap doors to permit the fall of said articles; a rotatable member arranged to catch each fallen article; automatic means for rotating said catching member one-half of a rotation after the fall of every other article; trap doors for said catching member; automatic means for tripping and resetting said last mentioned trap doors; revoluble receiving means arranged under said catching means to receive articles therefrom in a pile; and automatic means for revolving said receiving means to remove said pile, substantially as described.

33. A stacking machine comprising a supporting table; a traveling member arranged above said table; downwardly projecting members on said traveling member arranged to contact with and push articles along said table; trap doors arranged in said table; automatic means, operable by said traveling member, for tripping and resetting said trap doors to permit the fall of said articles; a rotatable member arranged to catch each fallen article; automatic means, operable by said traveling member, for rotating said catching member one-half of a rotation after the fall of every other article; trap doors for said catching member; automatic means, operable by said traveling member, for tripping and resetting said last mentioned trap doors; revoluble receiving means arranged under said catching means to receive articles therefrom in a pile; and automatic means for revolving said receiving means to remove said pile, substantially as described.

34. A stacking machine comprising a supporting table; a traveling member arranged above said table; downwardly projecting members on said traveling member arranged to contact with and push articles along said table; trap doors arranged in said table; automatic means, operable by said traveling member, for tripping and resetting said trap doors to permit the fall of said articles; a rotatable member arranged to catch each fallen article; automatic means, operable by said traveling member, for rotating said catching member one-half of a rotation after the fall of every other article; trap doors for said catching members; automatic means, operable by said traveling member, for tripping and resetting said last-mentioned trap doors; revoluble receiving means arranged under said catching means to receive articles therefrom in a pile; and automatic means, operable by said traveling member, for revolving said receiving means to remove said pile, substantially as described.

35. A stacking machine comprising a supporting table; a traveling member arranged above said table; downwardly projecting members on said traveling member arranged to contact with and push articles along said table; trap doors arranged in said table; automatic means for tripping and resetting said trap doors to permit the fall of said articles; a rotatable member arranged to catch each fallen article; automatic means for rotating said catching member one-half of a rotation after the fall of every other article; trap doors for said catching member; automatic means for tripping and resetting said last mentioned trap doors; a rotatable receiving member arranged under said catching means; a plurality of receiving hoppers arranged on said receiving member to revolve into registration with said catching means sucessively; and automatic means arranged to rotate said receiving member through a partial rotation to cause said hoppers to register with said catching means successively, substantially as described.

36. A stacking machine comprising a supporting table; a traveling member arranged above said table; downwardly projecting members on said traveling member arranged to contact with and push articles along said table; trap doors arranged in said table; automatic means, operable by said traveling member, for tripping and resetting said trap doors to permit the fall of said articles; a rotatable member arranged to catch each fallen article; automatic means, operable by said traveling member, for rotating said catching member one-half of a rotation after the fall of every other article; trap doors for said catching member; automatic means, operable by said traveling member, for tripping and resetting said last mentioned trap doors; a rotatable receiving member arranged under said catching means; a plurality of receiving hoppers arranged on said receiving member to revolve into registration with said catching means successively; and automatic means arranged to rotate said receiving member through a partial rotation to cause said hoppers to register with said catching means successively, substantially as described.

37. A stacking machine comprising a supporting table; a traveling member arranged above said table; downwardly projecting members on said traveling member arranged to contact with and push articles along said table; trap doors arranged in said table; automatic means, operable by said traveling member, for tripping and resetting said trap doors to permit the fall of said articles; a rotatable member arranged to catch each fallen article; automatic means, operable by said traveling member, for rotating said catching member one-half of a rotation after the fall of every other article; trap doors for said catching member; automatic means, operable by said traveling member, for tripping and resetting said last mentioned trap doors; a rotatable receiving member arranged under said catching means; a plurality of receiving hoppers arranged on said receiving member to revolve into registration with said catching means successively; and automatic means, operable by said traveling member, arranged to rotate said receiving member through a partial rotation to cause said hoppers to register with said catching means successively, substantially as described.

38. A stacking machine comprising a conveyer; means for causing articles to fall from said conveyer; an adjustable rotatable member arranged to catch each fallen article; adjustable automatic means for rotating said catching member one-half of a rotation after the fall of every other article; and adjustable means for releasing said caught articles, substantially as described.

39. A stacking machine comprising an adjustable conveyer; adjustable means for causing articles to fall from said conveyer; an adjustable rotatable member arranged to catch each fallen article; adjustable automatic means for rotating said catching member one-half of a rotation after the fall of every other article; trap doors for said catching member; and adjustable automatic means for tripping said trap doors to permit the fall of said articles, substantially as described.

40. A stacking machine comprising an adjustable conveyer; adjustable means for causing articles to fall from said conveyer; an adjustable rotatable member arranged to catch each fallen article; adjustable automatic means for rotating said catching member one-half of a rotation after the fall of every other article; trap doors for said catching member; adjustable automatic means for tripping said trap doors to permit the fall of said articles; and adjustable automatic means for resetting said trap doors after the fall of each article therefrom, substantially as described.

41. A stacking machine comprising a supporting table; a traveling member arranged above said table; downwardly projecting members adjustable on said traveling member arranged to contact with and push articles along said table; trap doors arranged in said table; adjustable automatic means for tripping and resetting said trap doors to permit the fall of said articles; an adjustable rotatable member arranged to catch each fallen article; adjustable automatic means for rotating said catching member one-half of a rotation after the fall of every other article; trap doors for said catching member; and adjustable automatic means for tripping and resetting said last mentioned trap doors, substantially as described.

42. A stacking machine comprising a supporting table; a traveling member arranged above said table; downwardly projecting members adjustable on said traveling member arranged to contact with and push articles along said table; trap doors arranged in said table; adjustable automatic means for tripping and resetting said trap doors to permit the fall of said articles; an adjustable rotatable member arranged to catch each fallen article; adjustable automatic means for rotating said catching member one-half of a rotation after the fall of every other article; trap doors for said catching member; adjustable automatic means for tripping and resetting said last mentioned trap doors; revoluble adjustable receiving means arranged under said catching means to receive articles therefrom in a pile; and adjustable automatic means for revolving said receiving means to remove said pile, substantially as described.

43. A stacking machine comprising a supporting table; a traveling member arranged above said table; downwardly projecting members adjustable on said traveling member arranged to contact with and push articles along said table; trap doors arranged in said table; adjustable automatic means for tripping and resetting said trap doors to permit the fall of said articles; an adjustable rotatable member arranged to catch each fallen article; adjustable automatic means for rotating said catching member one-half of a rotation after the fall of every other article; trap doors for said catching member; adjustable automatic means for tripping and resetting said last mentioned trap doors; an adjustable rotatable receiving member arranged under said catching means; a plurality of adjustable receiving hoppers arranged on said receiving member to revolve into registration with said catching means successively; and adjustable automatic means arranged to rotate said receiving member through a partial rotation to cause said hoppers to register with said catching means successively, substantially as described.

44. A stacking machine comprising a supporting table; a traveling member arranged above said table; downwardly projecting members adjustable on said traveling member arranged to contact with and push articles along said table; trap doors arranged in said table; automatic means, operable by said traveling member, for tripping and resetting said trap doors to permit the fall of said articles; an adjustable rotatable member arranged to catch each fallen article; adjustable automatic means, operable by said traveling member, for rotating said catching member one-half of a rotation after the fall of every other article; trap doors for said catching member; adjustable automatic means, operable by said traveling member, for tripping and resetting said last mentioned trap doors; a rotatable receiving member arranged under said catching means; a plurality of adjustable receiving hoppers arranged on said receiving member to revolve into registration with said catching means successively; and adjustable automatic means, operable by said traveling member, arranged to rotate said receiving member through a partial rotation to cause said hoppers to register with said catching means successively, substantially as described.

45. A stacking machine comprising a supporting table; a traveling member arranged above said table; downwardly projecting members on said traveling member arranged to contact with and push articles along said table; a pair of downwardly and outwardly swinging trap doors in said table; a spring catch arranged to hold said doors normally in supporting positions; means on said traveling member for releasing said spring catch; a gear rotatably mounted centrally below said trap doors; a reversing hopper passing centrally through said gear; trap doors constituting the bottom of said hopper; an operative connection, carried by said hopper and arranged to cause simultaneous movements of the trap doors thereon; a spring catch on said hopper arranged to hold the trap doors thereon normally in supporting positions; two separately operable sets of means arranged diametrically on opposite sides of said hopper for releasing the spring catch thereon; permanently positioned means, operable by said traveling member, for operating either of said sets of spring releasing means; two separately operable sets of resetting means for said trap doors arranged diametrically on opposite sides of said hopper; permanently positioned means operable by said traveling member for operating either of said sets of resetting means; means, operable by said traveling member, for rotating said gear through half a rotation after every other operation of the table trap doors; receiving means arranged under said hopper to receive articles therefrom in a pile; and automatic means, operable by said conveyer, for operating said receiving means to remove said pile, substantially as described.

46. A stacking machine comprising a supporting table; a traveling member arranged above said table; downwardly projecting members adjustable on said traveling member arranged to contact with and push articles along said table; a pair of downwardly and outwardly swinging trap doors in said table; a spring catch arranged to hold said doors normally in supporting positions; adjustable means on said traveling member for releasing said spring catch; a gear rotatably mounted centrally below said trap doors; an adjustable reversing hopper passing centrally through said gear; trap doors constituting the bottom of said hopper; an operative connection carried by said hopper and arranged to cause simultaneous movements of the trap doors thereon; a spring catch on said hopper arranged to hold the trap doors thereon normally in supporting positions; two separately operable sets of means arranged diametrically on opposite sides of said hopper for releasing the spring catch thereon; permanently positioned adjustable means, operable by said traveling member, for operating either of said sets of spring releasing means; two separately operable sets of resetting means for said trap doors arranged diametrically on opposite sides of said hopper; permanently positioned adjustable means operable by said traveling member for operating either set of resetting means; adjustable means operable by said traveling member for rotating said gear through one-half of a rotation after every other operation of the table trap doors; adjustable receiving means arranged under said hopper to receive articles therefrom in a pile; and adjustable automatic means operable by said conveyer for operating said receiving means to remove said pile, substantially as described.

47. A stacking machine comprising a supporting table; a traveling member arranged above said table; downwardly projecting members on said traveling member arranged to contact with and push articles along said table; a pair of downwardly and outwardly swinging trap doors in said table; a spring catch arranged to hold said doors normally in supporting positions; means on said traveling member for releasing said spring catch; a gear rotatably mounted centrally below said trap doors; a reversing hopper passing centrally through said gear; trap doors constituting the bottom of said hopper; an operative connection, carried by said hopper and arranged to cause simultaneous movements of the trap doors thereon; a spring catch on said hopper arranged to hold the trap doors thereon normally in supporting positions; two separately operable sets of means arranged diametrically on opposite sides of said hopper for releasing the spring catch thereon; permanently positioned means, operable by said traveling member, for operating either of said sets of spring releasing means; two separately operable sets of resetting means for said trap doors arranged diametrically on opposite sides of said hopper; permanently positioned means operable by said traveling member for operating either of said sets of resetting means; means, operable by said traveling member, for rotating said gear through half a rotation after every other operation of the table trap doors; a rotatable receiving table arranged with one side under said reversing hopper; a plurality of receiving hoppers arranged on said table to revolve into registration with said reversing hopper successively; and automatic means, operable by said traveling member, arranged to rotate said receiving table through a partial rotation to cause said hoppers to register with said reversing hopper successively, substantially as described.

48. A stacking machine comprising a supporting table; a traveling member arranged above said table; downwardly projecting members adjustable on said traveling member arranged to contact with and push articles along said table; a pair of downwardly and outwardly swinging trap doors in said table; a spring catch arranged to hold said doors normally in supporting positions; adjustable means on said traveling member for releasing said spring catch; a gear rotatably mounted centrally below said trap doors; an adjustable reversing hopper passing centrally through said gear; trap doors constituting the bottom of said hopper; an operative connection carried by said hopper and arranged to cause simultaneous movements of the trap doors thereon; a spring catch on said hopper arranged to hold the trap doors thereon normally in supporting positions; two separately operable sets of means arranged diametrically on opposite sides of said hopper for releasing the spring catch thereon; permanently positioned adjustable means, operable by said traveling member, for operating either of said sets of spring releasing means; two separately operable sets of resetting means for said trap doors arranged diametrically on opposite sides of said hopper; permanently positioned adjustable means operable by said traveling member for operating either set of resetting means; adjustable means operable by said traveling member for rotating said gear through one-half of a rotation after every other operation of the table trap doors; a rotatable receiving table arranged with one side under said reversing hopper; a plurality of adjustable receiving hoppers arranged on said table to revolve into registration with said reversing hopper successively; and adjustable automatic means, operable by said traveling member arranged to rotate said receiving table through a partial rotation to cause said hoppers to register with said reversing hopper successively, substantially as described.

49. As a sub-combination constituting a means of discharging articles from a supporting table, a pair of trap doors constituting a portion of said table; means for holding said trap doors in supporting positions; and automatic means for tripping and resetting said trap doors, substantially as described.

50. As a sub-combination constituting a means of discharging articles from a supporting table, a pair of trap doors constituting a portion of said table; an operative connection between said trap doors arranged to cause simultaneous movements thereof; means for holding said trap doors in supporting positions; and automatic means for tripping and resetting said trap doors, substantially as described.

51. As a sub-combination constituting a reversing means, a rotatable hopper; trap doors constituting the bottom of said hopper; means for rotating said hopper through a partial rotation; and automatic means for tripping and resetting said trap doors, substantially as described.

52. As a sub-combination constituting a reversing means, a rotatable hopper; trap doors constituting the bottom of said hopper; means for rotating said hopper through a partial rotation; a catch on said hopper arranged to hold the trap doors thereon normally in supporting positions; separately operable sets of means arranged on different sides of said hopper for releasing the catch thereon; automatically operating permanently position means for operating said releasing means; and automatic means for rotating said hopper to bring said sets of releasing means in operative relation with said permanently positioned operating means, substantially as described.

53. As a sub-combination constituting a removing means, a rotatable table; a plurality of receiving hoppers on said table; and automatic means for rotating said table to bring said hoppers successively in operative positions, substantially as described.

54. As a sub-combination constituting a removing means, a rotatable table; a plurality of receiving hoppers on said table, each of said hoppers comprising four upstanding angle irons, the rear legs of the rear angle irons for each hopper being spring held to facilitate removal of articles therein; and automatic means for rotating said table to bring said hoppers successively in operative positions, substantially as described.

55. The sub-combination of an assembling machine supporting table having a longitudinal slot therein; a traveling feed member arranged under said table; upwardly projecting feed members on said traveling member arranged to project through said slot and push articles along said table; an upwardly inclined slotted table forming a continuation of said first mentioned table and adapted to free said articles from said projections; a stacking machine table forming a continuation of said upwardly inclined table; a traveling feed member arranged above said stacking machine table; downwardly extending projections on said last mentioned feed member arranged to push articles along said stacking machine table; and means for removing articles downwardly from said stacking machine table, substantially as described.

56. The sub-combination of an assembling machine supporting table having a longitudinal slot therein; a traveling feed member arranged under said table; upwardly projecting feed members on said traveling member arranged to project through said slot and push articles along said table; an upwardly inclined slotted table forming a continuation of said first mentioned table and adapted to free said articles from said projections; a stacking machine table forming a continuation of said upwardly inclined table; a traveling feed member arranged above said stacking machine table; downwardly extending projections on said last mentioned feed member arranged to push articles along said stacking machine table; and means for causing articles to fall through said stacking machine table, substantially as described.

57. The sub-combination of an assembling machine supporting table having a longitudinal slot therein; a traveling feed member arranged under said table; upwardly projecting feed members on said traveling member arranged to project through said slot and push articles along said table; an upwardly inclined slotted table forming a continuation of said first mentioned table and adapted to free said articles from said projections; a stacking machine table forming a continuation of said upwardly inclined table; a traveling feed member arranged above said stacking machine table; downwardly extending projections on said last mentioned feed member arranged to push articles along said stacking machine table; trap doors arranged in said stacking machine table; and automatic means for tripping and resetting said trap doors, substantially as described.

58. The sub-combination of an assembling machine supporting table having a longitudinal slot therein; a traveling feed member arranged under said table; upwardly projecting feed members on said traveling member arranged to project through said slot and push articles along said table; an upwardly inclined slotted table forming a continuation of said first mentioned table and adapted to free said articles from said projections; a stacking machine table forming a continuation of said upwardly inclined table; a traveling feed member arranged above said stacking machine table; downwardly extending projections on said last mentioned feed member arranged to push articles along said stacking machine table; trap doors arranged in said staking machine table; automatic means for tripping and resetting said trap doors; means for catching a plurality of said articles in a pile; and automatic means for removing said pile, substantially as described.

In testimony whereof I have signed my name to this specification in the presence of two subscribing witnesses.

BRAYTON G. RICHARDS.

Witnesses:
JOSHUA R. HOPPE,
ARTHUR A. OLSON.

Copies of this patent may be obtained for five cents each, by addressing the "Commissioner of Patents, Washington, D. C."